United States Patent
Parsadayan et al.

(10) Patent No.: US 6,850,822 B2
(45) Date of Patent: Feb. 1, 2005

(54) METHOD AND APPARATUS FOR PREVENTING OVERHEATING OF SECURITY GATE MOTOR

(75) Inventors: Walter Parsadayan, Lake Forest, CA (US); Wayne C. Hom, Rancho Santa Margarita, CA (US); Alex Parsadayan, Lake Forest, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 280 days.

(21) Appl. No.: 09/861,283

(22) Filed: May 18, 2001

(65) Prior Publication Data

US 2002/0173880 A1 Nov. 21, 2002

(51) Int. Cl.[7] .......................... G05D 23/00; H02H 7/08
(52) U.S. Cl. ........................ 700/299; 318/473; 361/25
(58) Field of Search ................................ 700/275, 278, 700/299; 318/471–473; 361/25–27, 103

(56) References Cited

U.S. PATENT DOCUMENTS 4,357,565 A * 11/1982 Saito et al. ................. 318/473
6,191,546 B1 * 2/2001 Bausch et al. .............. 318/471

* cited by examiner

Primary Examiner—Leo Picard
Assistant Examiner—Steven R. Garland
(74) Attorney, Agent, or Firm—Fitch, Even, Tabin & Flannery

(57) ABSTRACT

A security gate operating system, is disclosed which comprises an electrically powered motor; a thermally controlled circuit breaker set to remove power to the motor when the motor reaches a preselected threshold temperature; a cooling fan associated with the motor and selectively powered to provide auxiliary cooling to the motor to prevent the motor from overheating; and a cooling fan motor controller, adapted to selectively supply power to the cooling fan when the motor is approaching the threshold temperature. The apparatus can further comprise the cooling fan controller being a thermo-static switch set to close at a preselected temperature below the threshold temperature, or a programmed microprocessor/microcontroller programmed to provide power to the cooling fan at a preselected temperature below the threshold temperature or when the temperature of the motor is about to reach the preselected temperature.

8 Claims, 4 Drawing Sheets

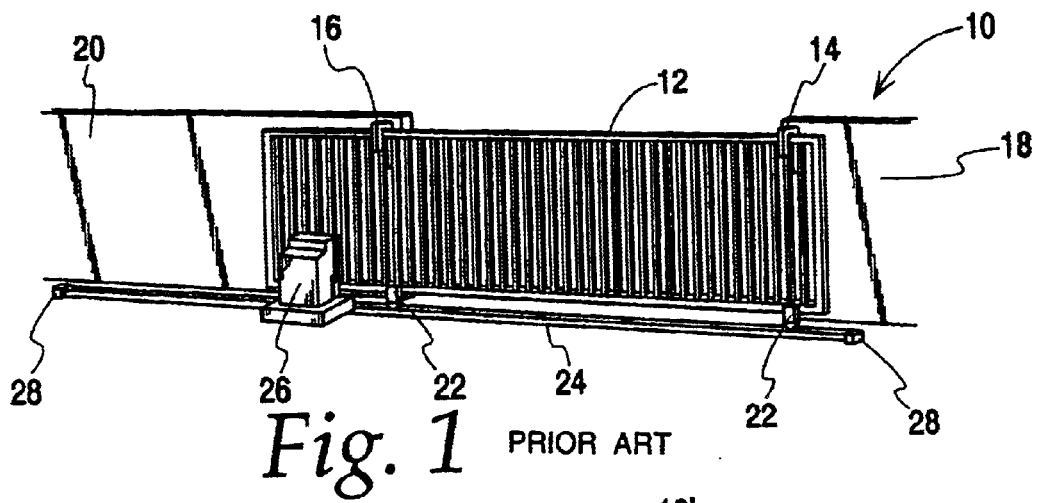
Fig. 1 PRIOR ART
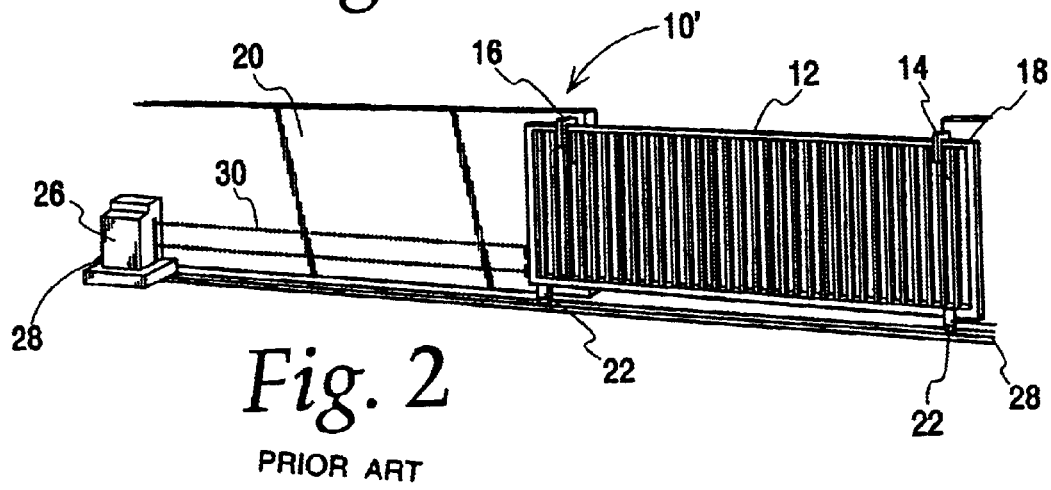
Fig. 2 PRIOR ART
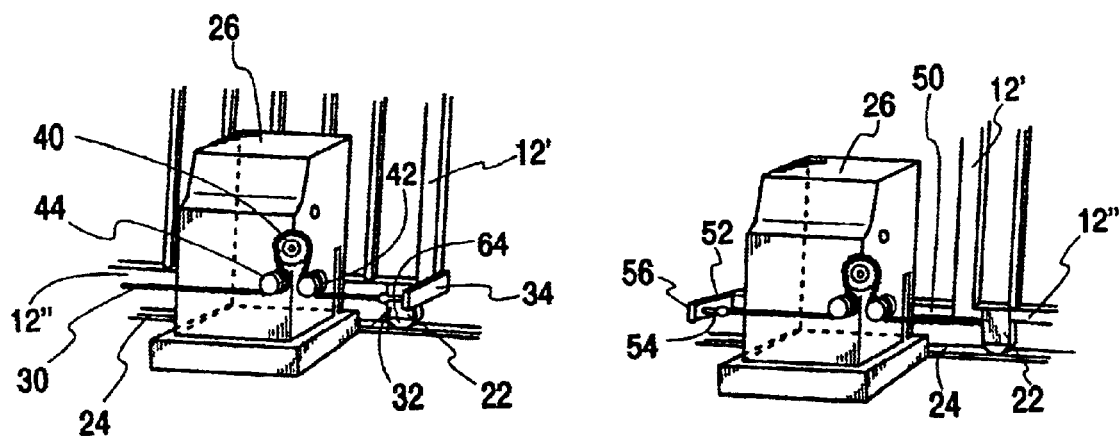
Fig. 3 PRIOR ART
Fig. 4 PRIOR ART

METHOD AND APPARATUS FOR PREVENTING OVERHEATING OF SECURITY GATE MOTOR

FIELD OF THE INVENTION

The present invention relates to the field of security gate operating systems, and more specifically a method and apparatus for preventing overheating of a security gate operating motor.

BACKGROUND OF THE INVENTION

It is well known to operate security gates with a motor driven mechanism, and FIG. 1 shows one form of such a security gate system and FIG. 2 shows another form of such a security gate. FIG. 3 shows in more detail the front installation of a drive chain mechanism associated with the form of security gate operating mechanism shown in FIG. 1 and FIG. 4 shows another form of security gate chain drive operating mechanism, a so-called rear installation, associated with FIG. 2. It is known to attempt to prevent motor overheating by sensing the overheating or an over-current situation, which can lead to or has led to overheating, and tripping a switch or a circuit breaker, as the case may be, which shuts off the motor. The motor could be shut off in the middle of moving the security gate from a closed position to an open position or from the open position to a closed position. In either event, the gate could be left in a position where it is blocking the passage into or out of the facility for which it is serving as a security gate. Similarly the gate could be left in the fully closed position or essentially the fully closed position, also blocking ingress or egress, or in the fully open or essentially fully open position, thereby no longer serving to operate as a security gate, i.e., preventing unauthorized ingress into the facility. In known systems, this situation is maintained until someone physically resets the circuit breaker of un-trips the switch so as to turn on the motor again, after the overheating/over-current event is ended. Systems of the type existing in the prior art may be required to have thermal shut off breakers, e.g., for Underwriter's Laboratories certification. such breakers do not allow for resetting except by human intervention, which could result in a security gate being stuck in a certain position until such time as such a breaker is reset. There is a need, therefore, to be able to avoid over-current/ overheating circumstances and to automatically recover to the normal mode of operating the security gate motor when the over-current/overheating event has ended.

SUMMARY OF THE INVENTION

A security gate operating system, is disclosed which comprises an electrically powered motor; a thermally controlled circuit breaker set to remove power to the motor when the motor reaches a preselected threshold temperature; a cooling fan associated with the motor and selectively powered to provide auxiliary cooling to the motor to prevent the motor from overheating; and a cooling fan motor controller, adapted to selectively supply power to the cooling fan when the motor is approaching the threshold temperature. The apparatus can further comprise the cooling fan controller being a thermo-static switch set to close at a preselected temperature below the threshold temperature, or a programmed microprocessor/microcontroller programmed to provide power to the cooling fan at a preselected temperature below the threshold temperature or when the temperature of the motor is about to reach the preselected temperature.

BRIEF DESCRIPTION OF THE DRAWINGS

FIG. 1 (Prior Art) shows a security gate operating system of a type in which the present invention may be utilized;

FIG. 2 (Prior Art) shows another form of a security gate system of a type in which the present invention may be utilized;

FIG. 3 (Prior Art) shows a security gate drive mechanism of the type useful in the security gate operating mechanism of FIG. 1;

FIG. 4 (Prior Art) shows another view of the a security gate drive mechanism of the type useful in the security gate operating mechanism of FIG. 1, with the security gate in a position opposite from that shown in FIG. 3;

DETAILED DESCRIPTION OF THE PREFERRED EMBODIMENTS

Figure 5:
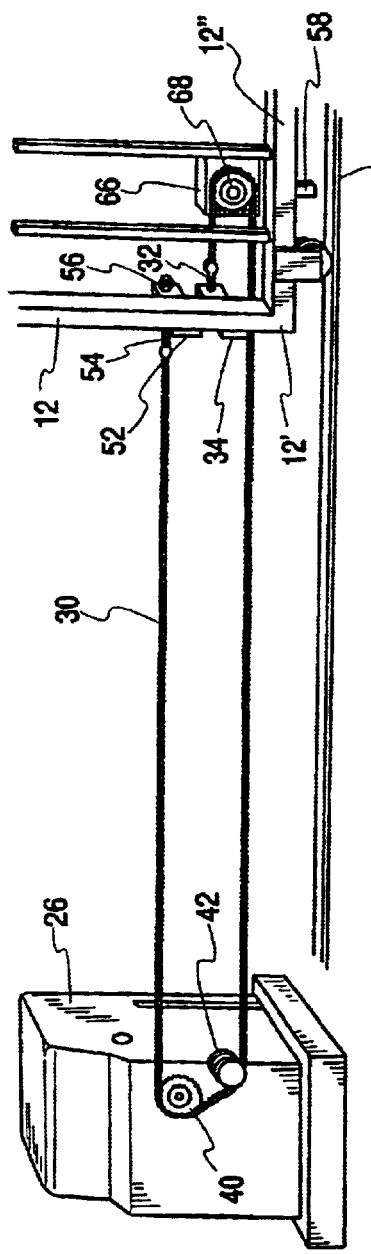
FIG. 5 (Prior Art) shows a security gate drive mechanism of the type useful in the security gate operating mechanism of FIG. 2.

Turning now to FIG. 1 (Prior Art), there is shown a known form of security gate system 10. The security gate system 10 shown in FIG. 1 is an example of a so-called front installation security gate system 10. The security gate system 10 has a sliding gate 12, which is partially mounted for sliding movement by mounting brackets 14 and 16 to wall sections 18 and 20, respectively. The sliding gate 12 has a pair of rollers 22 that engage a track 24. The gate is driven by a security gate drive mechanism 26, as more fully described in regard to FIG. 3 below. The security gate 12 is driven by a chain drive, more fully described in regard to FIG. 3 between a pair of physical travel stops 28.

Turning now to FIG. 2 (Prior Art) there is shown another form of security gate system 10'. The security gate system 10' shown in FIG. 2 is an example of a so-called rear installation security gate system 10'. The security gate system 10' also has a sliding gate 12, which is partially mounted for sliding movement by mounting brackets 14 and 16 to wall sections 18 and 20, respectively. The sliding gate 12 has a pair of rollers 22 that engage a track 24. The gate is driven by a security gate drive mechanism 26, as more fully described in regard to FIG. 3 below. The security gate 12 is driven by a chain drive, more fully described in regard to FIG. 3 between a pair of physical travel stops 28.

The difference between the security gate system 10 of FIG. 1 and the security gate system 10' of FIG. 2 is that the chain drive for operating the security gate 12 through movement of chain 30 runs along the bottom of the gate 12 in the embodiment of FIG. 1 and is fully behind the respective wall section 20 in the embodiment of FIG. 2, for added security purposes. The chain 30 is also attached to the security gate 12 and security gate drive mechanism slightly differently as explained in more detail in regard to FIGS. 3 and 4.

Turning now to FIG. 3 (Prior Art) there is shown in more detail a security gate drive mechanism 26 for the embodiment of FIG. 1 as it would appear from a view facing away from the wall section 20 shown in FIG. 1. The security gate drive mechanism has a chain drive sprocket 40, which engages the drive chain 30 after it passes around a first pulley 42. The chain subsequently passes around a second pulley 44, as shown in FIG. 3. As also shown in FIG. 3 the chain 30 is attached to the sliding gate 12 by an attachment mechanism 32. The attachment mechanism 32 includes an attachment bar 34, which is attached to the sliding gate 12 as shown in FIG. 3, e.g., by welding the attachment bar 34 to the sliding gate 12 in the position shown in FIG. 3. The attachment mechanism 32 is described in more detail below in regard to FIG. 7.

Turning now to FIG. 4 (Prior Art) there is shown a view of the sliding gate 12 when it is at the opposite end of its travel. The sliding gate 12 is shown in FIG. 4 to be attached to the drive chain 30 by a gate extension arm 50, to which is attached a mounting bar 52, e.g., by welding to the gate extension arm 50. The gate extension arm 50 is itself attached to the sliding gate 12, e.g., by welding the extension arm 50 to the sliding gate 12 in the position as shown in FIG. 4. The drive chain 30 is in turn connected to the mounting bar 52 by a chain attachment mechanism 54, which is held on the mounting bar 52 by a nut 56. The extension arm 50 is cut to a particular size or welded along the lower horizontal portion 12" of the frame of the sliding gate 12 such that the chain is relatively taught when the sliding gate 12 is at the extent of its travel, as shown in FIG. 4, and thereafter the chain attachment mechanism 32 and 54 can be threaded through the respective attachment bar 34 and/or 52 to fully tighten the chain before engaging the chain to the respective chain attachment mechanism 32 and/or 54.

Turning now to FIG. 5 (Prior Art) there is shown a security gate drive mechanism 26 of the type shown in the embodiment of FIG. 2. Here the drive chain 30 passes over the drive sprocket 40 and around only the first pulley 42. One end of the drive chain is attached to the sliding gate by an attachment bar 52, which is attached to the sliding gate 12, as by welding the attachment bar 56 to the sliding gate 12, through an attachment mechanism 54 having a nut 56. The other end of the chain 30 passes around a sprocket 68 rotatably mounted on a sprocket block 66, which is in turn mounted to a sprocket block post 58, e.g., by welding the sprocket block 66 to the sprocket block post 58. The sprocket block post 58 is in turn mounted to the lower horizontal frame member 12" of the sliding gate 12, as by welding the sprocket block post 58 to the lower horizontal frame member 12" at such a location that the chain is taught in its extension over the sprocket to the mounting bar 34, to which it is attached by chain attachment mechanism 32.

Figure 6:
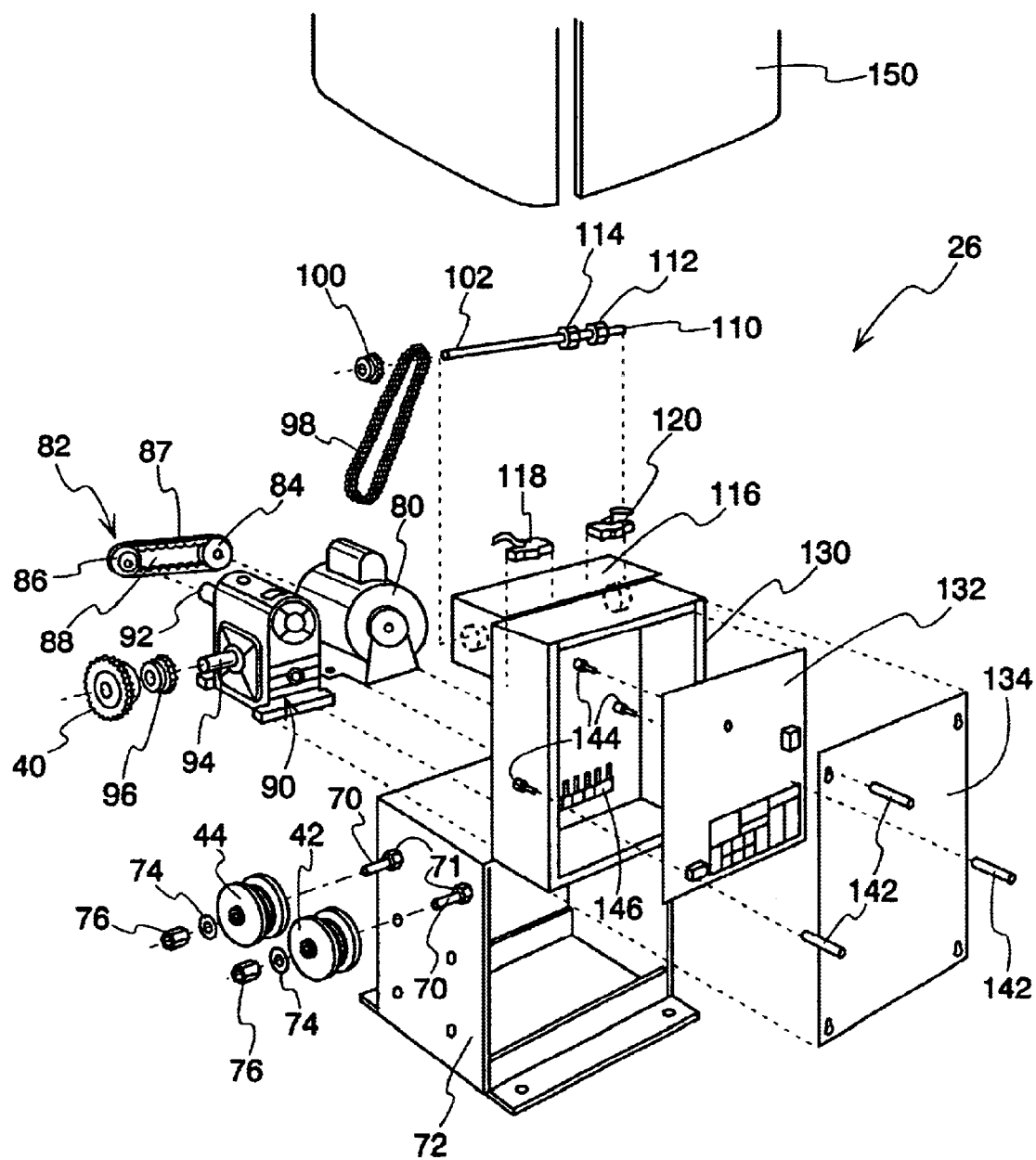
FIG. 6 (Prior Art) shows an exploded view of the security gate drive mechanism shown in FIGS. 1, 3 and 4.

Turning now to FIG. 6 (Prior Art), there is shown an exploded view of a security gate drive mechanism 26, as shown in FIG. 1 or FIG. 2. The security gate drive mechanism 26 has a frame 72. As shown in FIG. 6, the pulley wheels 42, 44, which can be, e.g., slotted UHMW rollers adapted to prevent chain slippage off of the drive sprocket 40, by keeping the drive chain 30 on the pulley wheels 42, 44 in their respective slots in alignment with the drive sprocket 40 during operation. The drive chain 30 can be, e.g., a #41 chain. As shown, the pulley wheels 42, 44 are attached to the frame 72 by a respective stationary axels 70, each having a threaded end attached to a respective nut 71, which may be attached to the frame 72, as by welding to the frame 72. The respective pulley wheels 42,44 are held in place on the respective axles 70 by a washer 74 and a capped nut 76.

The security gate drive mechanism also includes a motor 80, which can be, e.g., a one-half horse power instant reversing 120 VAC, 4 amp, 1625 rpm, parking gate motor, such as that made and sold by Leeson, Model No. 100741.50, which can include high speed ball gearings for smoother and quieter operation. In the alternative, the motor 80 can be a permanent magnet 12V DC motor, e.g. that made and sold by TRU-TORQ, Model No. 970-535. The motor 80 has a drive shaft, not shown, that connects to a sprocket wheel 84, which is part of a sprocket transfer unit 82. the sprocket transfer unit 82 also has a second sprocket wheel 86, and a chain or a drive belt 87, which extends around the sprocket wheels 84 and 86. A chain shield 88 covers the sprocket wheels 84 and 86 and the chain 87. The sprocket wheel 86 is attached to an input shaft 92 of a reduction gear 90, which also has an output shaft 94. The reduction gear can be, e.g., a 30-1 worm gear reducer with the gears operating in an oil bath, such as that made and sold by Hampton, Model No. M008. Attached to the output shaft 94 of the reduction gear 90 is the chain drive sprocket 40 and a smaller sprocket 96, internally mounted on the output shaft 94 in relation to the chain drive sprocket 40.

The inner sprocket 96 is connected by a drive chain 98 to a sprocket wheel 100, which is attached to the end of a limit control spindle 102, having threads 110. Moveably mounted on the threads 110 of the motion limit controller spindle 102 are a pair of traveling nuts 112 and 114. The limit controller spindle 102 is rotatably mounted in a motion limit controller housing 116, which is in turn attached to the frame 72. Slideably mounted on the spindle 102 are a pair of adjustably positionable stop members 118 and 120, which are electrically connected to a controller on a circuit board 132 and can provide a signal indicating that the drive chain 30 has reached one end or the other of its extent of desired motion, as by contact of one or the other of the traveling nuts 112 or 114 with its respective stop member 118 or 120.

Also shown in FIG. 6 is a controller circuit board housing 130, which is attached to the frame 72 and in which is contained the controller circuit board 132. A cover 134 is attached to the housing 130 and spacers 142, seat the controller circuit board 132 against input/output electrical signal connections 146 by virtue of being screwed into mounting screws 144, connected to the interior wall of the housing 130.

Figure 7:
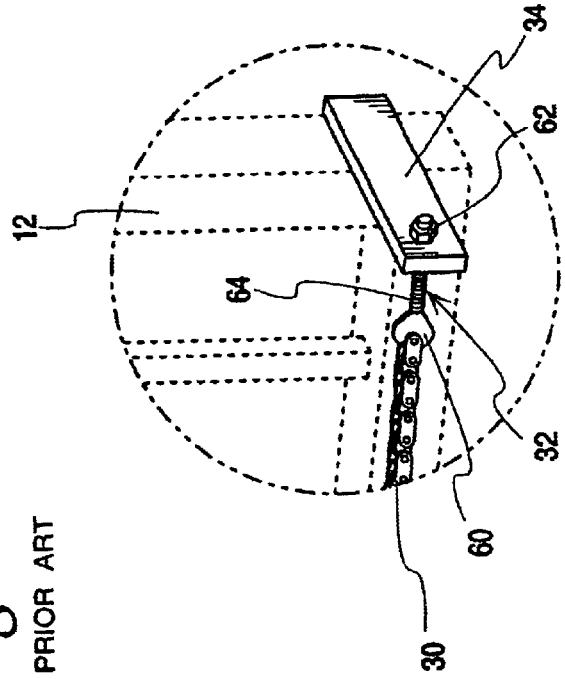
FIG. 7 (Prior Art) shows an enlarged view of a portion of the security gate drive mechanism shown in FIGS. 1, 3 and 4.

Turning now to FIG. 7 (Prior Art), there is shown in more detail the connection of the drive chain to the sliding gate, such as in the embodiments of FIGS. 1 and 3. The chain attachment mechanism 32 has a threaded shaft portion 64, which is threaded into nut 62 after passing through a hole in the attachment bar 34. The chain attachment mechanism 32 has a flattened attachment extension 60, to which the chain 30 is attached by passing the pin of the last link of the chain through an opening in the extension 60.

It is also well known in the prior art that the motor 80 of a security gate operating system 10 can come with an internal fan and/or an external fan can in addition be supplied, each of which are in operation whenever the motor 80 is in operation.

Figure 8:
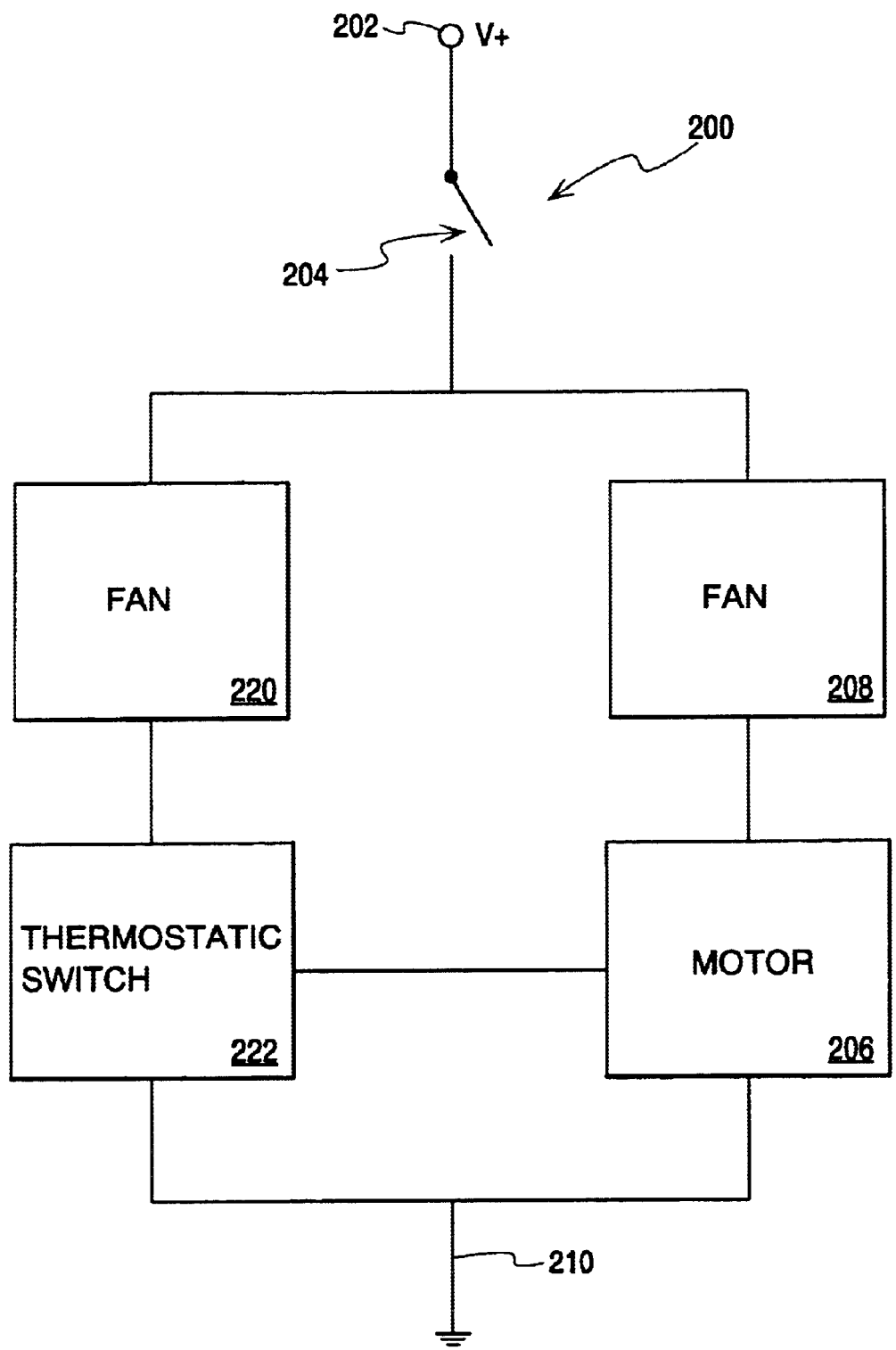
FIG. 8 shows a schematic view of a cooling fan control system according to the present invention.

Turning now to FIG. 8 there is shown an example of an overheating/overload control circuit 200 according to an embodiment of the present invention. The circuit 200 can include a power source 202 such as a positive 12 volt DC source, which can be supplied through an on/off switch 204 to a motor 206. The motor can be as described above with respect to the prior art security gate operating mechanism, and can have associated with it a fan 208. The fan 208 can be internal to the motor 206 housing or external thereto or can be a combination of both such fans, which fan(s) 208 is energized when the motor is energized and in operation. the circuit 200 can also include a ground connection 210. The circuit 200 can further include an auxiliary fan 220, which can be energized through a switch, e.g., a thermo-static switch 222. The thermostatic switch 222 can be a Burnital thermostatic switch. The thermostatic switch 222 can be connected to the casing of the motor, or otherwise in contact with the motor or in sufficiently close proximity to the motor to sense the temperature of the motor, and specifically when the motor has exceeded some threshold temperature and/or is about to exceed some threshold temperature, in order for the auxiliary fan to be turned on in sufficient time to pass air across the outer casing of the motor 206 and/or the motor 206 vent openings, in order to cool the motor 206 sufficiently to prevent operation of the thermal breaker(s), which would result in shutting off the motor and stopping the movement of the security gate until such breaker(s) was reset. eliminated from the prior art is the need to use an oversized motor, or two motor, one as a backup, or an oversized fan always operating when the security gate operating system motor(s) was in operation, causing undue expense, power consumption and increased space requirements.

The circuit 200 of the present invention can supply input to the security gate controller contained on the circuit board 132 to provide input to a programmed processor/controller to, e.g., interpolate changes in the temperature of the motor 206, e.g., from background ambient, or with respect to a selected threshold temperature and/or a series of such threshold temperatures, as may be necessary to determine the point at which to turn on the auxiliary motor 220. In this event, the thermostatic switch 222 may be replaced with a switch operated by the security gate operating system controller on the circuit board 132. An algorithm for determining the point at which to turn on the auxiliary fan 220, can include the following: $T_{AMB}+(\Delta TEMP/\Delta TIME)=THRESHOLD?ON:OFF$.

While the preferred embodiments of the present invention have been shown and described, it will be apparent to those skilled in the art that various modifications may be made in these embodiments without departing from the spirit of the present invention. For that reason, the scope of the invention is set forth in the following claims:

We claim:

1. A security gate operating system, comprising:
   an electrically powered motor;
   a thermally controlled circuit breaker set to remove power to the motor when the motor reaches a preselected threshold temperature;
   a cooling fan associated with the motor and selectively powered to provide auxiliary cooling to the motor to prevent the motor from overheating;
   a cooling fan controller, to selectively supply power to the cooling fan when the motor is approaching the threshold temperature;
   a security gate controller for selectively energizing the motor to move a security gate; and
   the security gate controller comprises the cooling fan controller.

2. A security gate operating system, comprising:
   an electrically powered motor;
   a thermally controlled circuit breaker set to remove power to the motor when the motor reaches a preselected threshold temperature;
   a cooling fan associated with the motor and selectively powered to provide auxiliary cooling to the motor to prevent the motor from overheating;
   a cooling fan controller, to selectively supply power to the cooling fan when the motor is approaching the threshold temperature; and
   wherein the cooling fan controller interpolates the temperature of motor and selectively supplies power to the cooling fan in response to such interpolation.

3. A security gate operating system, comprising:
   an electrically powered motor;
   a thermally controlled circuit breaker set to remove power to the motor when the motor reaches a preselected threshold temperature;
   a cooling fan associated with the motor and selectively powered to provide auxiliary cooling to the motor to prevent the motor from overheating;
   a cooling fan controller, to selectively supply power to the cooling fan when the motor is approaching the threshold temperature; and
   wherein the cooling fan controller selectively applies power to the cooling fan in response to a rate of change of motor temperature.

4. A security gate operating system, comprising:
   an electrically powered motor;
   a thermally controlled circuit breaker set to remove power to the motor when the motor reaches a preselected threshold temperature;
   a cooling fan associated with the motor and selectively powered to provide auxiliary cooling to the motor to prevent the motor from overheating;
   a cooling fan controller means, adapted to selectively supply power to the cooling fan when the motor is approaching the threshold temperature;
   a security gate controller for selectively energizing the motor to move a security gate; and
   the security gate controller comprises the cooling fan controller means.

5. A security gate operating system, comprising:
   an electrically powered motor;
   a thermally controlled circuit breaker set to remove power to the motor when the motor reaches a preselected threshold temperature;
   a cooling fan associated with the motor and selectively powered to provide auxiliary cooling to the motor to prevent the motor from overheating;
   a cooling fan controller means, adapted to selectively supply power to the cooling fan when the motor is approaching the threshold temperature; and
   wherein the cooling fan controller means interpolates the temperature of the motor and selectively supplies power to the cooling fan in response to such interpolation.

6. A security gate operating system, comprising:
   an electrically powered motor;
   a thermally controlled circuit breaker set to remove power to the motor when the motor reaches a preselected threshold temperature;
   a cooling fan associated with the motor and selectively powered to provide auxiliary cooling to the motor to prevent the motor from overheating;
   a cooling fan controller means, adapted to selectively supply power to the cooling fan when the motor is approaching the threshold temperature; and
   wherein the cooling fan controller means selectively applies power to the cooling fan in response to a rate of change of motor temperature.

7. A method of operating a security gate, comprising:
   driving the security gate with an electrically powered motor;

providing a thermally controlled circuit breaker set to remove power to the motor when the motor reaches a preselected threshold temperature;

operating a cooling fan associated with the motor by selectively powering the cooling fan to provide auxiliary cooling to the motor to prevent the motor from overheating;

controlling the cooling fan by selectively supplying power to the cooling fan when the motor is approaching the threshold temperature; and wherein the controlling step comprises selectively supplying power to the cooling fan in response to a rate of change of motor temperature.

8. A method of operating a security gate, comprising:

driving the security gate with an electrically powered motor;

providing a thermally controlled circuit breaker set to remove power to the motor when the motor reaches a preselected threshold temperature;

operating a cooling fan associated with the motor by selectively powering the cooling fan to provide auxiliary cooling to the motor to prevent the motor from overheating;

controlling the cooling fan by selectively supplying power to the cooling fan when the motor is approaching the threshold temperature; and wherein the step of controlling the cooling fan comprises interpolating the temperature of the motor.

* * * * *